United States Patent Office 3,420,899
Patented Jan. 7, 1969

3,420,899
PROCESS FOR THE CATALYTIC PREPARATION OF CYCLODODECATRIENES-1,5,9 FROM CONJUGATED DIOLEFINS AND CATALYSTS THEREFOR
Carlo Longiave, Renato Castelli, and Alberto Andreetta, Novara, and Angelo Garberi, Cilavegna, Pavia, Italy, assignors to Montecatini Edison, S.p.A., Milan, Italy
No Drawing. Continuation of application Ser. No. 293,262, July 8, 1963. This application July 25, 1967, Ser. No. 655,962
Claims priority, application Italy, July 9, 1962, 13,540/62
U.S. Cl. 260—666      11 Claims
Int. Cl. C07c 3/60; C07c 3/10

ABSTRACT OF THE DISCLOSURE

The present invention relates to a catalytic process for the preparation of 1,5,9 cyclododecatriene. According to the present invention, the ring of the conjugated diolefin is closed by using a catalyst consisting of a titanium halide selected from the group consisting of tri- and tetravalent halides complexed with an organic nitrogen basic compound and an alkyl aluminum dihalide complexed with a Lewis base. The catalyst of the present invention is soluble in the reaction solvent, acts in a homogeneous phase, and appears extremely stereospecific in the cyclic trimerization of the conjugated diolefins (butadiene-1,3, isoprene, piperylene, etc.). It consists of four essential components:
(A) A titanium halide;
(B) An organic nitrogen-containing substance to form the complex with the titanium halide;
(C) An alkyl aluminum dihalide;
(D) An electron-donor substance of the Lewis base type to form a complex with the organic aluminum halide.
The ratio of the complexing substance to the organic aluminum halide must be such that there remains in the reaction solution an amount of uncomplexed aluminum compound equal to at least 1.5 grams per liter of solution.

---

This application is a continuation of Ser. No. 293,262, filed July 8, 1963, and now abandoned.

This invention relates to catalytic processes and more particularly to a process for the preparation of cyclododecatriene-1,5,9 and of substituted cyclododecatrienes-1, 5,9 by cyclic trimerization of the conjugated diolefin in the presence of catalysts.

Italian Patents Nos. 568,727, 606,606, 602,501, and 614,050 described processes for the preparation of cyclododecatrienes from conjugated diolefins with the aid of catalytic systems consisting of titanium halides and alkyl aluminum halides, chromium halides and aluminum alkyls, titanium or chromium halides and aluminum hydride or complex metal hydrides.

Italian Patent No. 628,333 teaches, for ring closure of diolefins to yield cyclododecatrines, the use of catalysts obtained from titanium halides and alkyl aluminum halides to which compounds containing in the molecule a semi-polar double bond (sulfoxides, aminoxides, nitrones) are added.

The catalysts described in all cited patents are of heterogeneous nature and therefore promote, together with the formation of cyclododecatriene, the formation of by-products (1,5-cyclooctadiene-3-vinyl-cyclohexene, higher homologues of cyclododecatriene, open chain polymeric compounds of butadiene). The presence of by-products, besides lowering the yields, renders difficult the recovery and purification of the cyclododecatrienes. Italian Patent 628,333 teaches a process wherein the formation of linear, solid polymers is reduced, but not completely eliminated.

Copending U.S. patent application Ser. No. 181,181, filed on Mar. 3, 1962, describes a process for ring closure of conjugated diolefins to yield cyclododecatrienes, eliminating completely the formation of linear solid high polymers and reducing the formation of such liquid polymers to very low amounts. The process is characterized by the use of a catalyst soluble in the reaction solvent, which is obtained by mixing an organic aluminum halide of the type $AlR_2X$ (wherein R is a hydrocarbon radical and X is a halogen) with a complexed titanium halide that is soluble in the reaction solvent. The complex is formed with organic nitrogen-containing substances (primary aliphatic amines, cycloaliphatic amines, heterocyclic compounds containing at least one nitrogen atom in the ring, etc.).

The above homogeneous catalyst is highly stereospecific since it directs the polymerization almost completely to the formation of the cyclic trimer, particularly in the case of butadiene, to the formation of cyclododecatriene-1,5,9. However, it presents two inconveniences: (1) a rather low rate of reaction, requiring long contact time (at least 6 hours) to obtain a good conversion of the monomer to the cyclic trimer; and (2) low stability; it loses its kinetic and stereospecific activity, if aged for some time after its preparation.

It is an object of this invention to provide a catalyst for the ring closure of conjugated diolefins to yield cyclododecatrienes. It is another object of this invention to provide a process for the almost exclusive formation of cyclic trimers at high rates. It is a further object to provide a catalyst that is stable with regard to its kinetic qualities and with regard to its stereospecific qualities. It is a further object of this invention to provide processes for the utilization of such catalysts.

We have now found a catalyst for the ring closure of conjugated diolefins to yield cyclododecatrienes which, beside directing the reaction to almost exclusive formation of the cyclic trimers, permits effecting the reaction at high rates with nearly total conversion in time periods that are about one tenth of those described in the above-mentioned copending earlier U.S. patent application. Furthermore, the new catalyst is stable and may be prepared many hours or days before use. It may be stored at room temperature or even at higher temperatures (80–100° C.) without losing its initial activity. The only precaution regarding its stability is that it must be stored away from contact with air or moisture.

The catalyst of our present invention is soluble in the reaction solvent, acts in a homogeneous phase, and appears extremely stereospecific in the cyclic trimerization of the conjugated diolefins (butadiene-1,3, isoprene, piperylene, etc.). It consists of four essential components:
(A) A titanium halide;
(B) An organic nitrogen-containing substance to form the complex with the titanium halide;
(C) Alkyl aluminum dihalide;
(D) An electron-donor substance of the Lewis base type to form a complex with the organic aluminum halide.

As titanium halides there may be employed both the trivalent and the tetravalent titanium halides. The trivalent halides, and especially titanium trichloride, furnish higher yields of cyclododecatrienes and are preferred. Other suitable halides are titanium tetrachloride, titanium tribromide, titanium tetraiodide. The complexing nitrogen-containing substance for the titanium halide may be either a primary amine or a heterocyclic compound containing a nitrogen atom in the ring. Among the primary amines, they may be aliphatic, cycloaliphatic or arylaliphatic. The primary aliphatic amines should have at least 4 carbon atoms in the main chain. Such amines include n-hexylamine and nonylamine. Other amines that have been found to dissolve the titanium halides satisfactorily and to yield stable complexes, include primary 5,5-dimethyl-hexylamine and primary 3,5,5-trimethyl-hexylamine. Among the arylaliphatic amines with the amine group attached to the aliphatic group, there may be mentioned deltaphenylbutylamine. Satisfactory complexing heterocyclic compounds include pyridine, piperidine, quinoline, and hydrogenated quinoline.

In the preparation of the titanium complex, the organic nitrogen-containing compound is employed in proportions of 1–10 mols per mol of titanium halide. The titanium complex is prepared by reacting the titanium halide with the nitrogen compound alone or in an inert solvent. The solution of titanium salt in the amine may be prepared in the following manner. In a perfectly dry and de-aerated 500 cc. flask are introduced 2 grams of titanium trichloride (0.013 mol) and 10 grams of primary 5,5-dimethylhexylamine (0.078 mol). The contents of the flask are mixed and heated for about one hour at 80° C. A blue-black-colored mass forms, to which are added 300 cc. of anhydrous benzene. After stirring for four hours, a limpid solution is obtained which is green-brown-colored and in which is dissolved practically all of the titanium (about 0.042 mol/l. of titanium). This catalyst component is very stable, provided that it is stored under anhydrous conditions in the absence of air and moisture.

The alkyl aluminum dihalide has the general formula $AlRX_2$ wherein R is alkyl and X is a halogen. The alkyl aluminum dihalide may also be employed admixed with alkyl aluminum monohalide having the formula $AlR'_2X$ (wherein R' is an alkyl, equal to or different from R) provided that the compound $AlRX_2$ forms at least 50% by mols of the mixture. The alkyl aluminum halide may be complexed with the Lewis base before or after it is reacted with the soluble titanium complex described above.

The presence of the electron-donor group in the catalyst appears to be essential; in the absence of this donor group (Lewis base), the catalyst forms, besides cyclododecatriene, substantial amounts of other linear or cyclic polymers of the starting diolefins. Such other polymers decrease the yield of the process. However, when the Lewis base is present, the catalyst is extremely stereospecific and promotes the polymerization of the olefins to the formation almost exclusively of cyclic trimers. The yields are higher than 90% in the case of butadiene. As complexing compounds of the organic aluminum halide there are employed organic Lewis bases, i.e. organic substances which contain an atom capable of releasing a pair of electrons. Suitable bases include the aliphatic and aromatic aldehydes, which may be saturated and unsaturated, and include such compounds as acetaldehyde, propionic aldehyde, butyraldehyde, acrolein, benzaldehyde. Another class of Lewis bases are the ethers, preferably the saturated aliphatic ethers including diethyl ether, dipropylether, methyl-propylether. Another group of Lewis bases are the esters, preferably those from aliphatic or aromatic saturated acids and aliphatic monovalent alcohols, such as ethyl acetate, ethyl butyrate. Another class of Lewis bases suitable in this invention are the amines, such as the primary alkylamines, including ethylamine, isopropylamine, hexylamine; the secondary alkylamines, such as dimethylamine, diethylamine; and the tertiary alkylamines, such as trimethylamine, triethylamine; and the arylamines, including aniline and diphenylamine. A further class of Lewis bases suitable for this invention are heterocyclic substances, such as pyridine, isoquinoline, furan, thiophene.

The ratio of the complexing substance to the organic aluminum halide must be such that there remains in the reaction solution an amount of uncomplexed aluminum compound equal to at least 1.5 grams per liter of solution.

Solvents may be employed for the catalyst. They must be inert with respect to the organometallic complexes and must be capable of dissolving the entire catalyst complex. Among suitable solvents are the aromatic and cycloaliphatic hydrocarbons; the halo derivatives of the aromatic hydrocarbons. The paraffinic solvents are less suitable due to the low solubility of a catalyst in this class of solvents. However, they may be used, nevertheless, in admixture with aromatic solvents such as benzene and toluene.

The monomers that are most satisfactorily converted into the cyclic trimers by the catalyst and process according to this invention are conjugated diolefins, such as butadiene-1,3; isoprene; and piperylene. The diolefins may be used either pure or admixed with other hydrocarbons, such as alkanes and/or alkenes. It is possible to use for the production of cyclododecatrienes, the mixture of hydrocarbons $C_4$ obtained from petroleum cracking or from the dehydrogenation of butane or of butenes. Such latter mixtures contain, besides butadiene, isobutane, butane, butene-1, and butene-2.

In general, the catalyst is prepared by introducing it into the solvent, first the alkyl aluminum halide, then the electron-donor compound, and finally the solution of the complex titanium halide with the nitrogen compound.

This particular catalyst does not require much of the titanium halide, and generally from 0.1 to 10 millimols per liter of reaction mixture is sufficient. The general preferred range is from 0.3 to 3 millimols/liter.

The amounts of the organo-aluminum compound that are necessary in the catalyst composition are substantially higher than those of the titanium compound and should range from 10 to 40 millimols/liter of reaction mixture. Higher amounts may be used but there is no particular advantage. The electron-donor compound for complexing the aluminum compound in a coordination complex is preferably used in 10–30% by mol of the hydrocarbyl aluminum dihalide.

The concentration of diolefins in the reaction system may be varied within rather wide limits. Generally, concentrations of 20–800 grams per liter of solvent, and preferably 50–250 grams per liter of solvent are used.

The operative range of temperatures is between 0 and 150° C., and it is generally preferred to operate this process between 50 and 100° C. The pressure is autogenous to the reaction conditions. The time necessary to complete the reaction is quite short and depends upon the amount of catalyst, the concentration of monomer, and the temperature at which the reaction is run. In a batch operation of cyclic trimerization of butadiene, nearly quantitative yields of cyclododecatriene are obtained in periods varying from 10 minutes to 1 hour, by operating in benzene with a catalyst according to this invention consisting of titanium trichloride complexed with primary 5,5-dimethylhexylamine, and ethyl aluminum dichloride complexes with diethyl ether.

The catalyst of this invention and the process based thereon are particularly suitable for a continuous operation which is performed in one or more reactors that are thermostatically controlled and are each provided with a stirrer; into the reactors are introduced continuously the solvent, the catalyst and the monomer to be cyclized. When the reaction is completed, the reacted solution is treated with a small amount of alcohol or water to destroy the catalyst. The solvent is then recovered by fractional distillation initially at atmospheric pressure until all the solvent is distilled and the unreacting hydrocarbons accompanying the diolefin are removed. Then the pressure in the distillation apparatus is reduced and the pure cyclododecatriene is recovered. The cyclododecatriene may also be recovered by steam distillation. In the case of the cyclization of butadiene, cyclododecatriene-1,5,9 is recovered, for example, by distillation at 100° C. under a residual pressure of 10 mm. Hg.

The cyclododecatrienes that are obtained from butadiene-1,3, according to the process of this invention, consist essentially (above 90%) of a stereoisomer: cis-trans-trans and of small amounts (1–8%) of the transtrans-trans-stereoisomer. The two stereoisomers have been identified by means of their I.R. spectra and both boiling and melting points (100° C./11 mm. Hg and −18° C. in the case of cis-trans-trans isomer; 95° C./13 mm. Hg and 34° C. in the case of the trans-trans-trans isomer).

The following polymerization examples are intended to illustrate our invention without any limitation to the scope thereof intended.

EXAMPLE 1

2.5 g. of ethyl aluminum dichloride (19.7 millimols), 0.290 g. of diethyl ether (3.94 millimols) and 300 cc. of anhydrous benzene are introduced into an inox steel 1800-cc. autoclave that is carefully dried and deaerated, and is provided with a stirrer and a thermostat. 400 cc. of a benzene solution of the complex titanium trichloride-primary 5,5-dimethyl-hexylamine containing 0.0774 g. of titanium trichloride (0.5 millimol) are then added; ratio N/Ti=6. The temperature is raised to 50° C. while stirring, and 105 g. of Rubber Grade butadiene-1,3 are introduced. The stirring and the temperature are maintained for one hour. Then 30 cc. of methyl alcohol are added into the autoclave to destroy the catalyst. The reacted solution is discharged from the autoclave, and treated with HCl to eliminate the catalyst residue. Two layers are obtained; the upper one, concentrated under vacuum, leaves as a residue 103 g. of an oil that by fractional distillation yields 99 g. of cyclododecatriene-1,5,9 (yield=94.2%).

EXAMPLE 2

The test is carried out in the same apparatus and in the same manner as described in Example 1. An amount of 2.5 g. equimolar mixture of diethyl aluminum monochloride and ethyl aluminum dichloride is employed, maintaining unchanged the amount of the other substances forming the catalyst.

The temperature is raised to 80° C., and 140 g. of "Rubber Grade" butadiene (in liquid phase) are introduced. The reaction is continued for 45 minutes. Then the catalyst is destroyed with 50 cc. of methyl alcohol, and the crude is discharged from the autoclave.

The solution is washed with diluted HCl, the solvent is evaporated under vacuum. Obtained are 136 g. of oil which is subjected to fractional distillation under vacuum. 132.5 g. of cyclododecatriene-1,5,9 are recovered (yield= 94.6%), of which 91% consist of the cis,trans,trans-stereoisomer and 9% of the trans,trans,trans-stereoisomer. Solid polymers are not obtained.

EXAMPLE 3

The method is performed as in Example 2, except that 2.5 g. of a mixture of diethyl aluminum chloride and ethyl aluminum dichloride containing 80% of ethyl aluminum dichloride is used, employing n-butyl ether (0.51 g.=3.94 mm.) as a complexing agent of the aluminum-organic component. The titanium complex is used in the amounts indicated above.

The temperature of the autoclave is raised to 60° C., and 80 g. of "Rubber Grade" butadiene are introduced into the liquid phase. After 30 minutes the reaction is stopped by destroying the catalyst with 50 cc. of methanol, and the reaction product is discharged from the autoclave. After the usual treatment for purification, concentration and rectification of the oil, 72.9 g. of cyclododecatriene-1,5,9 are recovered (yield=91%). Solid polymers are not formed.

EXAMPLE 4

Charged into the autoclave are 2.5 g. of ethyl aluminum dichloride (19.7 mM.) dissolved in 300 cc. of anhydrous toluene, and 0.23 g. of pyridine (2.95 mM.) dissolved in 50 cc. of toluene. Then 350 cc. of toluene solution of the complex titanium trichloride/primary trimethyl-hexylamine-3,5,5 containing 0.0774 g. of titanium trichloride (0.5 mM.); ratio N/Ti=6 are added.

110 g. of "Rubber Grade" butadiene in liquid phase are introduced and the temperature is raised rapidly to 70° C. The stirring and the temperature are maintained for 90 minutes: The catalyst is destroyed; the reaction product is discharged from the autoclave, and is submitted to the usual treatments for the recovery of cyclododecatriene. Obtained are 106 g. of cyclododecatriene-1,5,9 (yield =96.4%).

EXAMPLE 5

This test was carried out employing butadiene in mixture with other hydrocarbons. The composition of the mixture was as follows:

| | | |
|---|---|---|
| Propane | percent | 0.1 |
| Propylene | do | 0.1 |
| Isobutane | do | 1.6 |
| n-Butane | do | 12.4 |
| Butene-1 | do | 36.7 |
| Butene-2 trans | do | 12.4 |
| Butene-2 cis | do | 5.2 |
| Butadiene-1,3 | do | 31.5 |
| Acetylene compounds | p.p.m | <20 |
| Water | p.p.m | 150 |

3 g. of ethyl aluminum dichloride (23.6 mM.) in 500 cc. of anhydrous benzene and 0.22 g. of diethyl ether (2.95 mM.) are introduced into the autoclave. Then 320 g. of the hydrocarbon mixture containing butadiene are added, and the temperature is raised to 65° C. 0.0774 g. of titanium trichloride (0.5 mM.) in the form of the complex titanium trichloride/5,5-dimethyl-hexylamine, that are dissolved in 200 cc. of benzene, are introduced by use of a nitrogen pressurized cylinder. The stirring and the temperature are maintained for two hours and then the catalyst is destroyed with 50 cc. of methanol. The reaction product is discharged and submitted to the usual operations of purifying and rectifying for the recovery of cyclododecatriene, 89 g. of cyclododecatriene-1,5,9 are obtained, corresponding to a yield of 88% in respect to butadiene. Solid polymers are not obtained.

EXAMPLE 6

Example 5 is repeated using the same amounts of reactants but varying the sequence of the charge. The reactants are introduced into the autoclave in the following sequence: ethyl aluminum dichloride in benzene, diethyl ether and solution of the complex titanium trichloride/ amine; the temperature is thermostatically set at 65° C., and then the hydrocarbon mixture containing butadiene is introduced into the autoclave. The reaction is continued for 90 minutes. After carrying out all recovery operations, 87 g. of cyclododecatriene-1,5,9 are obtained, corresponding to an 86% yield from the introduced butadiene. There is no formation of solid polymers.

EXAMPLE 7

The preparation of cyclododecatriene is carried out by operating in a continuous pilot plant. The plant consists of:

(a) Two tanks containing a benzene solution of the catalyst. The tanks are used alternately. Each contains a charge sufficient for 12 hours. The catalyst is obtained from ethyl aluminum dichloride, diethyl ether, titanium trichloride, and 5,5-dimethylhexylamine. The catalyst solution has the following composition:

| | G./l. benzene |
|---|---|
| Titanium trichloride | 0.1305 |
| Amine | 0.652 |
| Ethyl aluminum dichloride | 5.6 |
| Ether | 0.495 |

(b) Two tanks containing a benzene solution of butadiene. Each tank has a volume sufficient for a run of 15 hours. The butadiene solution has a concentration of 0.425 g. of $C_4H_6$/l. benzene.

(c) Two reactors each having a volumetric capacity of 38 liters, provided with a stirrer with arms, and a jacket for thermostatic temperature setting. The reactors are connected in series. The reactants are pumped at the base of the first reactor, are drawn off from the head and enter at the base of the second reactor. At the outlet of the second reactor, a small amount of methanol sufficient to destroy the catalyst is added to the reactor product. The two reactors are maintained at 65° C. by hot water circulation in the jacket. The hourly amounts of reactants pumped are as follows:

(1) 7.5 liters of a benzene solution of catalyst containing:

| | G. |
|---|---|
| Titanium trichloride | 0.98 |
| Amine | 4.9 |
| Ethyl aluminum dichloride | 42 |
| Ether | 3.72 |

(2) 7.4 liters of a benzene solution of butadiene containing 1.87 kg. butadiene.

The total reaction time is 5 hours.

The solution obtained after the destruction of the catalyst is washed with a soda solution to eliminate the acidity caused by catalyst decomposition, and is sent to a rectifying column. First the solvent is distilled at atmospheric pressure and then cyclododecatriene is distilled under vacuum at a residual pressure of 10 mm. Hg.

The run of the plant lasts 144 hours employing a total of 269.3 kg. of butadiene-1,3.

At the end of the operations there are obtained 250 kg. of cyclododecatriene-1,5,9 (yield=93%), consisting of 96% of cris,trans,trans-stereisomer, and 4% of trans,trans,trans-stereoisomer. There is no formation of solid polymers.

EXAMPLE 8

Used is an inox steel autoclave with stirrer and thermostat, previously dried and deaerated by means of repeated vacuum operations and washing with nitrogen. Introduced are 2.8 g. of ethyl aluminum dichloride (22 millimols) and 0.325 g. of diethyl ether (4.4 millimols) dissolved in 600 cc. of anhydrous benzene.

Then charged into the autoclave are 100 cc. benzene containing 0.1 g. titanium tetrachloride (0.527 millimol) complexed with primary 3,5,5-trimethylhexylamine (N/Ti=6)

The complex of titanium tetrachloride with the amine is prepared by mixing, at room temperature, into a benzene solution of titanium tetrachloride, the necessary amount of 3,5,5-trimethylhexylamine. A limpid orange-red solution is obtained. The autoclave is heated to 65° C. Then 110 g. "Rubber Grade" butadiene are introduced into the autoclave by evaporating the butadiene from the vessel in which it was previously weighed.

The absorption of butadiene is very rapid and, after one hour, the reaction is practically completed.

The catalyst is destroyed by introducing into the autoclave 50 cc. methanol, and the reaction product is discharged. After the usual operations to eliminate the catalyst and to evaporate the solvent, 109 g. of oils are obtained, and 98 g. of cyclododecatriene-1,5,9

(yield=89.1%)

are recovered by frictional distillation under vacuum. There is no formation of solid polymers.

EXAMPLE 9

Example 8 is repeated carrying out the reaction at 54° C. Butadiene is introduced into the autoclave through a pipe into liquid phase. 120 g. of butadiene are charged.

After 50 minutes the reaction is stopped by adding 30 cc. methanol. After the usual treatments to eliminate the catalyst residue and the solvent, 109 g. oil are obtained wherefrom 102 g. of cyclododecatriene-1,5,9 are recovered (yield=85%).

EXAMPLE 10

Into the autoclave of Example 8 are charged 600 cc. of a benzene solution containing 2.8 g. of ethyl aluminum dichloride (22 millimols) and 0.325 g. of diethyl ether (4.4 millimols). Then 100 cc. of benzene containing 0.0774 g. (0.5 millimol) of titanium trichloride complexed with primary 3,5,5-trimethylhexylamine (N/Ti=6)

and 109 g. isoprene are introduced. The reactor content is heated to 65° C. Stirring and temperature are maintained for 6 hours. The reaction is stopped by adding 30 cc. methanol into the reactor. The reaction product is discharged from the autoclave and treated with an excess of methanol to coagulate the polymer, if present.

20 g. of a semi-solid, sticky polymer are obtained. The liquid is evaporated, and 70 g. of oil are left as a residue and are subjected to fractional distillation under vacuum.

Thus recovered are 42.2 g. (yield=39.6%) of a limpid, colorless liquid that distills at 95–96° C. under a residual pressure of 4 mm. Hg, consisting of 1,5,9-trimethyl-1,5,9-cyclododecatriene.

EXAMPLE 11

The apparatus described in Example 8 is used. 600 cc. of a benzene solution containing 2.5 g. of $Al(C_2H_5)Cl_2$ (19.7 millimols) and 0.29 g. of ethyl ether (3.94 millimols) are charged in the autoclave.

100 cc. of benzene containing 0.278 g. of $TiI_4$ (0.5 millimol) complexed with primary 3,5,5-trimethylhexylamino (N/Ti ratio=6) are then introduced.

The complex of $TiI_4$ with the amine is prepared by mixing the two reactants in the pure state and in the suitable ratio, and then adding benzene in order to dissolve the complex thus formed. The solution of the complex is clear yellowish; when added to the $Al(C_2H_5)Cl_2$ solution it gives an orange-red color.

101 g. of "Rubber Grade" butadiene in the liquid phase are introduced and the temperature of the autoclave is quickly brought to 60° C. After 3 hours the reaction is practically completed and the catalyst is destroyed by introducing 50 cc. methanol into the autoclave. The reaction product is then discharged.

After the usual operations for elimination of the catalyst and evaporation of the solvent, 80 g. of oil are obtained from which, by fractional distillation under vacuum, 66.3 g. of 1,5,9-cyclododecatriene (yield=65.5%) are separated.

13 g. of a solid polymer are obtained.

EXAMPLE 12

The apparatus of Example 8 is used, and 600 cc. of benzene solution containing 2.5 g. of $Al(C_2H_5)Cl_2$ (19.7 millimols) and 0.29 g. of ethyl ether (3.94 millimols) are charged into the autoclave.

100 cc. of benzene containing 0.0774 g. of $TiCl_3$ (0.5 millimol) complexed with piperidine (N/Ti ratio=6) are then introduced. The complex of $TiCl_3$ with piperidine is prepared by mixing the two reactants in the pure state in the suitable ratio (a heat development is noted) and then adding benzene to dissolve the complex thus formed. The solution of the complex has a dark brown color, and when added to the $Al(C_2H_5)Cl_2$ solution a light green color is noted.

103 g. of "Rubber Grade" butadiene in the liquid phase are introduced and the temperature is quickly brought to 60° C.

After 1 hour and 45 minutes the reaction is completed. The reaction is stopped by addition of 50 cc. methanol. The usual operations then produce 102 g. oil from which 89 g. of 1,5,9-cyclododecatriene (yield of 86.5%) are separated by fractionated distillation.

EXAMPLE 13

By operating as in Example 1, 3.06 g. of aluminum isobutyl dichloride (19.7 millimols) are used instead of Al(C₂H₅)Cl₂. 105 g. of "Rubber Grade" butadiene are then introduced. After 3 hours and 30 minutes the reaction is practically completed.

By operating as usual, 95 g. of oil are obtained from which 79 g. of 1,5,9-cyclododecatriene (yield 75.2%) are recovered by distillation under vacuum.

No solid polymer is present.

We claim:

1. The process for the preparation of 1,5,9-cyclododecatrienes by ring closure of conjugated diolefin selected from 1,3-butadiene and isoprene, which comprises carrying out the reaction in a cyclic hydrocarbon as solvent, at a temperature from 50° to 100° C., in contact with a catalyst, soluble in the reaction mixture, consisting of: an alkyl aluminum dichloride complexed with an organic Lewis base, selected from the group consisting of ether and pyridine, wherein the Lewis base being used in a ratio of 10 to 30 mols percent of the alkyl aluminum dichloride to which a titanium chloride selected from the group consisting of tri- and tetravalent chloride complex with a primary amine has been added so that after mixing the complexed alkyl aluminum dichloride with the complexed titanium chloride at least 1.5 grams of uncomplexed alkyl aluminum dichloride is present per liter of reaction solution.

2. The process according to claim 1, wherein the conjugated diolefin and the catalyst are dissolved in an inert solvent from the group consisting of anhydrous benzene and anhydrous toluene.

3. The process according to claim 1, wherein the titanium chloride is titanium tetrachloride.

4. The process according to claim 1, wherein the primary amine to be complexed with the titanium chloride is chosen from the group selected from primary aliphatic, cycloaliphatic and aryl aliphatic amine.

5. The process according to claim 4, wherein the primary aliphatic amine is selected from the group comprising 5,5-dimethylhexylamine and 3,5,5 - trimethylhexyl amine.

6. The process according to claim 1, wherein the titanium chloride is titanium trichloride.

7. The process according to claim 1, wherein the alkyl aluminum dihalide is selected from the group consisting of ethyl aluminum dichloride and iso-butylaluminumdichloride.

8. The process according to claim 1, wherein the Lewis base complexed with the hydrocarbyl alkyl aluminum dihalide is diethyl ether.

9. The process according to claim 2, wherein the inert solvent is benzene.

10. A process for the preparation of cyclododecatriene-1,5,9, which comprises the ring closure of butadiene-1,3 in contact with benzene and a catalyst consisting of ethyl aluminum dichloride complexed with diethyl ether to which titanium trichloride complexed with 5,5-dimethylhexylamine has been added so that free ethyl aluminum dichloride is present, said ring closure being achieved at a temperature in the range of 50–100° C.

11. The process according to claim 1, wherein the titanium chloride is used in an amount of from 0.1 to 10 millimols per liter of reaction mixture and the alkyl aluminum dichloride in an amount of from 10 to 40 millimols per liter of reaction mixture.

References Cited

UNITED STATES PATENTS

| | | |
|---|---|---|
| 3,149,173 | 9/1964 | Wittenberg et al. _____ 260—666 |
| 3,214,484 | 10/1965 | Wittenberg et al. _____ 260—666 |

DELBERT E. GANTZ, *Primary Examiner.*

V. O'KEEFE, *Primary Examiner.*